United States Patent [19]

Dechamps

[11] 4,366,637

[45] Jan. 4, 1983

[54] SET OF ADVERTISING COMPONENTS

[76] Inventor: Dorian V. Dechamps, 12, rue Gatti de Gamond, 1180 Brussels, Belgium

[21] Appl. No.: 208,407

[22] Filed: Nov. 19, 1980

Related U.S. Application Data

[63] Continuation of Ser. No. 911,482, Jun. 1, 1978.

[30] Foreign Application Priority Data

Jun. 2, 1977 [BE] Belgium ................................ 178146

[51] Int. Cl.$^3$ ........................... G09F 7/04; G09B 1/08

[52] U.S. Cl. ........................................ 40/621; 40/600; 434/168; 434/190

[58] Field of Search ................. 40/600, 594, 595, 615, 40/405, 621; 434/73, 134, 168, 190, 409, 430, 172, 156, 167, 171, 193, 195, 196

[56] References Cited

U.S. PATENT DOCUMENTS

| | | | |
|---|---|---|---|
| 1,694,639 | 12/1928 | Brown | 40/621 X |
| 3,093,919 | 6/1963 | Holtz | 40/621 |
| 3,156,056 | 10/1964 | Pribil | 40/621 |
| 3,168,787 | 2/1965 | Surrey | 40/600 X |
| 3,186,323 | 6/1965 | Niehaus | 40/621 X |
| 3,226,838 | 1/1966 | Courrege et al. | 40/621 |
| 3,228,133 | 1/1966 | Baermann | 40/621 |
| 3,383,785 | 5/1968 | Werner | 40/621 X |
| 3,514,873 | 6/1970 | Stobbe | 434/190 |
| 3,654,711 | 4/1972 | Taylor | 434/426 |
| 3,716,935 | 2/1973 | Friederichs | 40/621 |
| 3,769,720 | 11/1973 | Terrones | 40/621 |
| 3,797,147 | 3/1974 | Lemberg | 40/405 |
| 3,928,921 | 12/1975 | Gurman | 40/621 X |
| 3,994,079 | 11/1976 | Mirman | 434/73 |
| 4,009,524 | 3/1977 | Valentine | 40/621 X |
| 4,112,598 | 9/1978 | Maass et al. | 434/430 |
| 4,242,823 | 1/1981 | Bruno | 40/621 |

FOREIGN PATENT DOCUMENTS

| | | | |
|---|---|---|---|
| 1384773 | 11/1964 | France | 40/621 |
| 2003640 | 3/1979 | United Kingdom | 40/621 |

*Primary Examiner*—Robert Peshock
*Assistant Examiner*—Michael Foycik
*Attorney, Agent, or Firm*—Pennie & Edmonds

[57] ABSTRACT

A kit of components for advertising purposes comprises a coated steel panel, a filling device having a plurality of coated steel sheets, and a plurality of flexible magnetic characters made from rubber or similar synthetic material having incorporated therein magnetic material such as barium ferrite such that the characters are both flexible and magnetic and may be applied either to the display panel or the filing device in a flat condition. When applied to the filing device the characters may be stored and transported without damage.

5 Claims, 10 Drawing Figures

Fig.3.
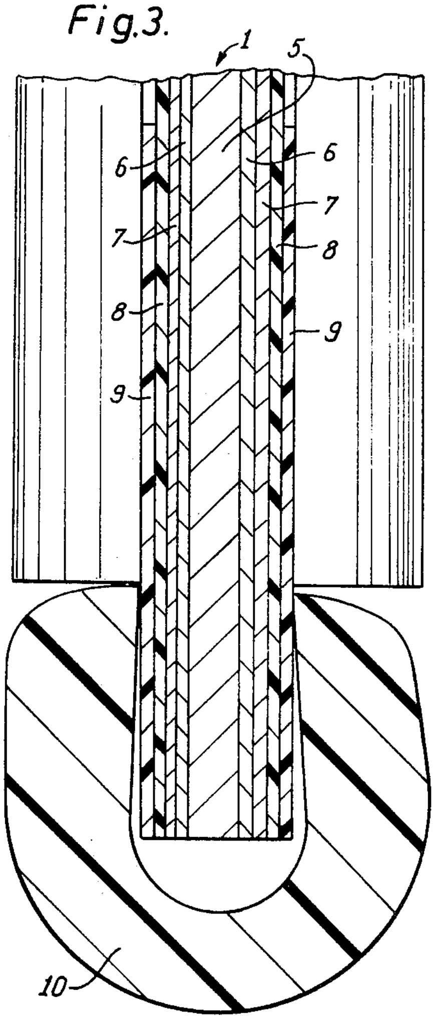
Fig.4.
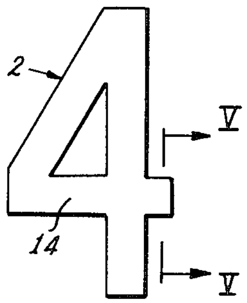
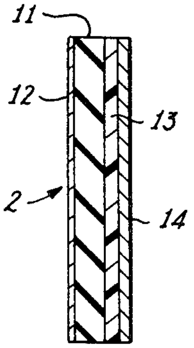
Fig.5.
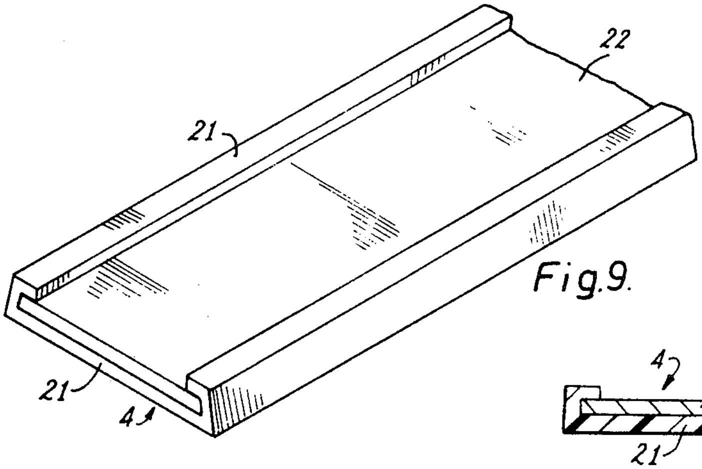
Fig.9.
Fig.10.
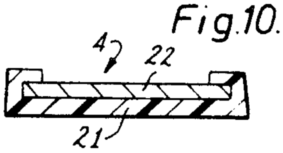

SET OF ADVERTISING COMPONENTS

This is a continuation, of application Ser. No. 911,482, filed June 1, 1978.

The present invention relates to a set of advertising components intended in particular for the advertising using placards of products offered in sales promotion campaigns in large stores.

In the field of placards relating to articles and products sold for promotion purposes in shops, and in particular, for placards indicating the prices and quantities of such articles or such products, paper placards are used bearing letters and figures forming characters that are painted by an expert letterer and which are applied with a marker or a stamp or are printed beforehand. These known placards made of paper are obviously flimsy and in practice can be used only once. These same known placards constitute a not insignificant monthly expense for the total expenditure of a large store and occupy an important place in the advertising budget.

In the same field of placard display, there are also used supports to which are affixed self-adhesive letters and/or figures. The supports are made, depending on the particular case, of a sheet of paper, of vinyl, of fabric or of cardboard or of a wooden or compressed asbestos plate. Moreover, the letters and the figures form characters, generally of wood or cork, and remain permanently stuck to the support and cannot be removed without being destroyed. Other known placards can also used only once and again represent for the total expenditure of a large store an investment that is almost completely lost.

In the same field of placard display, there are still used supports on which are arranged detachable letters and/or figures. In this case, the rigid supports are formed by a wooden plate having on their front face grooves defining between them guide slots into which the letters and/or figures are inserted by sliding. Furthermore, the letters and figures form the characters that are likewise rigid and usually made of cardboard. These latter known methods of placard display are certainly used but are particularly heavy, cumbersome and have no aesthetic appeal at all.

The subject of the invention is a novel set of advertising components intended for the same advertising purposes but distinctly more practical, lighter, more attractive and more economical than known cases. This set of advertising components may be used as desired, and the components in practice are hard-wearing and resistant to deterioration over a period of several years of use both outside and inside buildings or the like. This same set of advertising components permits the production of light and tasteful placards which can be suspended with virtually no danger in large stores. Moreover, the characters of this set of advertising components can be stored without risk of being damaged or lost.

To this end, the novel set of advertising components consists of a combination of a substantially metal panel, several flexible magnetic characters and a filing device comprising substantially metal plates. The panel is a steel sheet bearing on at least one of its faces a coating that is permeable to a magnetic field. The coating comprises a display base extending over the entire surface of the above-mentioned face of the metal sheet and a printed silk-screen layer applied to at least a portion of the surface of the display base. The flexible magnetic characters are each made of rubber or of similar synthetic material, carrying magnetic charges. These characters can be applied flat to the panel. The filing device comprises several plates each made of a thin sheet of steel coated on both faces with a protective coating permeable to a magnetic field. The plates in question enable the characters, which may be applied flat thereto, to be carried, arranged and stored.

In practice, in the novel set of advertising components, the steel sheet of the panel may be from 0.2 to 0.5 mm thick. In addition, this sheet may be electroplated.

Preferably, for the panel of the novel set of advertising components the display base has a thickness of about 0.325 mm.

If the display base of the panel of the novel set of advertising components is painted, this base is made up of a base coat of paint and a top coat of paint. Moreover, the base and top coats of paint may advantageously be stabilized by means of at least one suitable thermal treatment. For its protection, the top coat of paint is covered entirely or partially with a protective coat of vinyl.

If the display base of the panel of the novel set of advertising components is applied to the metal sheet, it comprises a self-adhesive sheet which is preferably coated, wholly or partially, with a protective coat of vinyl.

In the two above-mentioned cases, the protective coat of vinyl may be applied either directly to the top coat of paint or to the self-adhesive sheet of the display base, or is itself formed by a self-adhesive sheet applied to these same elements. Moreover, the protective coat of vinyl may be transparent or may optionally be colored and may even have a decorative effect.

In practice, in the novel set of advertising components, the silk-screen layer of the panel has a thickness of less than $50\mu$.

To prevent a glare effect from a placard produced using the novel set of advertising components the face of the panel with its silk-screen layer is matte.

To make the edges of a placard produced with the novel set of advertising components so that they are not sharp, the panel is provided along its edges with a border, a molding or with a frame having a protective and a safety function.

In practice, in the novel set of advertising components each character is cut out of a sheet of rubber or similar synthetic material carrying magnetic charges, and may have a thickness of less than 0.5 mm. To keep its magnetic properties at a maximum, each character has magnetic charges formed by barium ferrite having isotropic or anisotropic magnetisation. If necessary, the characters may be coloured as desired.

To prevent a character of the novel set of advertising components from permanently adhering and sticking to the panel, the character is covered on its reverse side with a film of anti-adhesive varnish. Moreover, to be protected, particularly against grooving and scratching, each character is covered on its obverse side with a protective coat of vinyl which may be colored as desired or may be transparent. In addition, the protective coat of vinyl of each character may be covered with a printed silk-screen layer. So that it does not glare the obverse side of each character is advantageously matte.

In the novel set of advertising components, the filing device may be a file having stacked plates or may comprise at least one drawer for superimposed plates or at least one container having suspended plates.

In the novel set of advertising components, each plate of the file is formed by a steel sheet having in practice a thickness of less that 0.010 mm, and preferably equal to 0.002 mm. Moreover, the protective coat of each plate of the file is generally made of a sheet of paper impregnated with vinyl and stuck to the steel sheet. In addition, the protective coat of each file plate may be colored and/or printed.

According to an interesting feature of the novel set of advertising components considerably facilitating the production of placards and ensuring suitable positioning of the characters on the panel, there is provided a magnetic strip which may be applied to this panel and which serves as a support for these characters to ensure that they are aligned in a predetermined manner as they are positioned.

According to structural features of the magnetic strip, it is formed by a slide bar made of rubber or a similar synthetic material carrying magnetic charges, and is strengthened by a flat member which cannot be deformed out of its plane. In practice, the slide bar is formed by a half-open profiled member enclosing the flat metal member. Furthermore, this profiled member and this flat member each generally have a thickness of about 1 mm.

Further details and characteristics of the invention will become evident during the description and from the drawings accompanying this specification which show, schematically and by way of example, only one embodiment of the invention.

FIG. 3 is a partial section of the panel, taken along the line III—III of FIG. 2.

FIG. 4 is a vertical view of a character of the set of advertising components.

FIG. 5 is a partial section of this character taken along the line V—V of FIG. 4.

FIG. 9 is a partial perspective view of the magnetic strip of the novel set of advertising components.

FIG. 10 is a transverse section of the strip.

In these various figures, the same reference numerals denote the same elements.

Figure 1:
FIG. 1 is a vertical view of a placard produced using a set of advertising components according to the invention.
Figure 2:
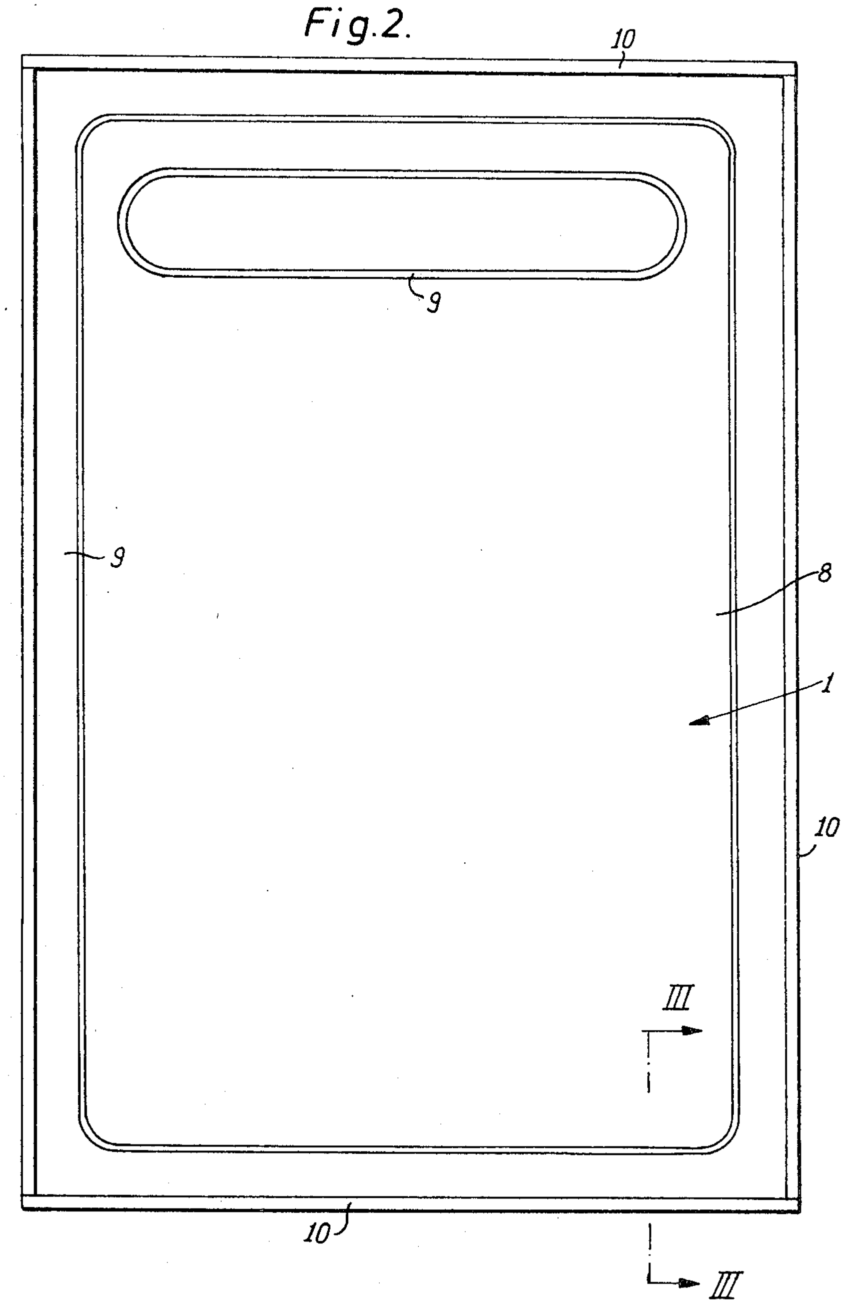
FIG. 2 is a vertical view of the panel of the set.
Figure 6:
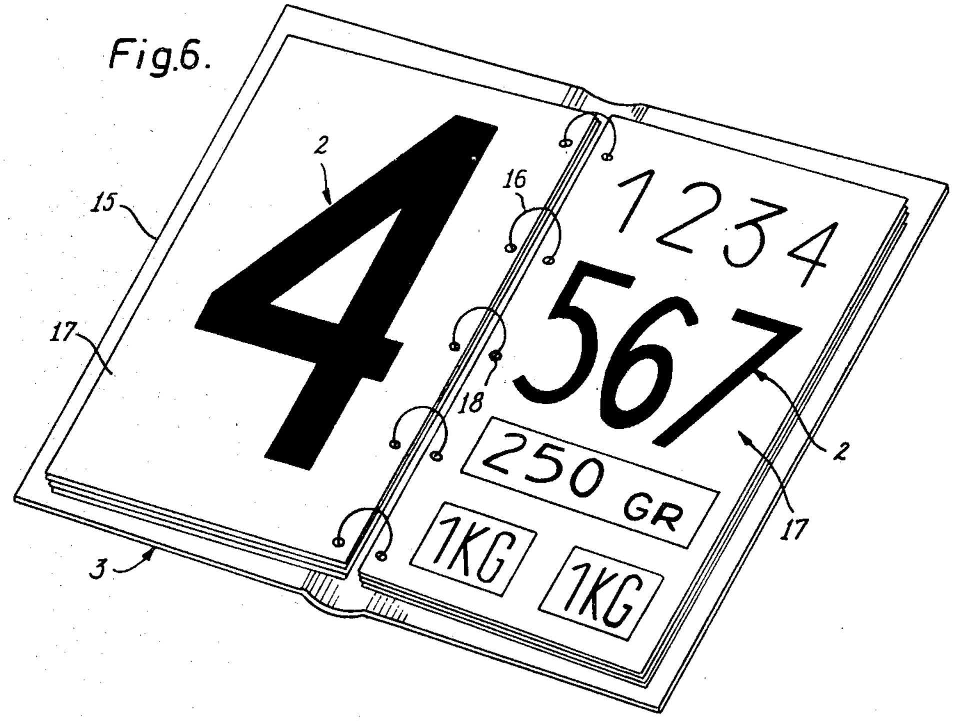
FIG. 6 is a perspective view of the file for the set of advertising components.
Figure 7:
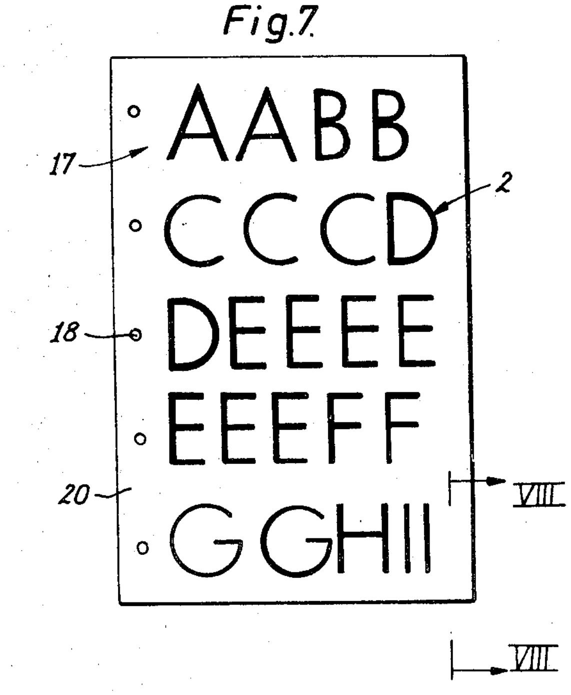
FIG. 7 is a plan view of a plate of the file.
Figure 8:
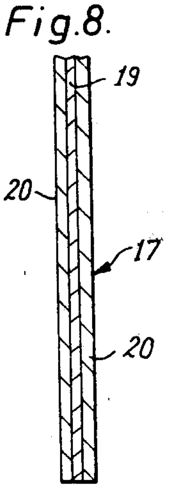
FIG. 8 is a section of the plate taken along the line VIII—VIII of FIG. 7.

The set of advertising components illustrated serves for advertising by means of placards. In particular, the set of advertising components in question enables placards to be produced indicating especially the unit prices of articles and products offered for sale in shops and other places of sale.

The set of advertising components shown comprises essentially a panel 1, several characters 2 and a filing device 3. In addition, this set of advertising components also advantageously comprises a magnetic strip 4.

In substance, the panel 1 is made of a steel sheet 5, preferably electroplated, having a thickness of between 0.2 and 0.5 mm, and for example, of about 0.325 mm. The steel sheet 5 has, for example, a rectangular configuration. The steel sheet, 5 has a coating permeable to a magnetic field, on its two faces and, more generally, on at least one of these faces. The coating comprises a display base extending over the entire surface of the sheet 5.

In the example selected, the display base is formed by a base coat of paint 6 and by a top coat of paint 7. The coats of paint 6 and 7 are stabilized as regards their composition by means of at least one thermal treatment. The coats of paint 6 and 7 are each of a thickness of less than about 0.05 mm, and together have a thickness of less than 0.1 mm to ensure that the display base is magnetically permeable.

On the panel 1, each top coat of paint 7 is covered entirely or partially with a protective vinyl coat 8. The protective coat 8, which is coloured selectively, or is transparent, is applied directly to the coat of paint 7. Advantageously, the protective coat 8 has a decorative effect.

The panel 1 finally comprises a printed silk-screen layer 9 which is applied directly to a part or to all of the protective coat 8. The silk-screen layer 9 has a thickness of less than 0.05 mm so that the magnetic permeability of the entire coating of the steel sheet 5 is not reduced.

Preferably, the obverse side of the panel 1 having the silk-screen layer 9 is matte.

Moreover, in the example chosen, the panel 1 is provided along its edges with borders 10 for protection and for safety reasons, these being, for example, profiled members made of rubber or a similar synthetic material. The profile of the borders 10 is almost in the shape of a "U", between the arms of which there is gripped the corresponding edge of the panel 1. In these variations, the panel 1 may be equipped along its edges with moldings or with a protective and safety frame fulfilling the function of the borders 10.

Finally, the panel 1 has means for suspending, for hooking or for fixing it to any type of support.

In the various embodiments of the panel 1, the display base mentioned above may be formed by a self-adhesive sheet applied to the sheet 5 and itself coated entirely or partially with a protective coat of vinyl 8. This latter coat 8 may be applied directly but may also be formed in its turn by another self-adhesive web of vinyl. In addition, the display base mentioned above, while comprising the two coats of paint 6 and 7, may be protected by a self-adhesive sheet of vinyl which thus constitutes the protective coat 8 mentioned above.

It should be noted that the panel 1 can be decorated with one or several motifs, either in relief or not, magnetic or non-magnetic.

Each character 2 is flexible and magnetic. For this purpose the character 2 is made of rubber or of a similar synthetic material, carrying magnetic charges formed preferably by barium ferrite with isotropic or anisotropic magnetization.

In practice, the characters 2 are cut out of a sheet 11 of magnetic rubber or magnetic synthetic material. The magnetic sheet 11 is provided on its reverse side with a film of anti-adhesive varnish 12, and is coated on its obverse side with a protective coat of vinyl 13. The protective coat of vinyl 13 may be transparent or colored as desired, and form a support for the printed silkscreen layer 14.

The characters 2 are in fact letters, figures, signs and motifs having a thickness of less than 0.5 mm and may be colored as desired by their protective coat 13 or by their silk-screen layer 14. In addition, the obverse side of each character 2 is matte to avoid intense reflection of incident light which reaches them.

In the example described, the filing device is a file 3 of the conventional type, comprising a folder 15 equipped with metal rings 16 which may be opened. The file 3 comprises plates 17 having at one side lateral holes 18 by means of which the plates 17 can be engaged with the rings 16 and stacked in the folder 15.

Each plate 17 is made of a steel sheet 19 covered on each face with a protective coat 20 of vinyl paper.

The steel sheet 19 has a thickness of 0.002 mm and, more generally, of less than 0.010 mm. The protective coat 20 is applied directly to the steel sheet 19. In fact, each protective coat 20, which is colored or transparent and has a thickness of less than 0.1 mm, is made of a sheet of paper impregnated with vinyl. In this manner the protective coat 20 is readily permeable to a magnetic field. In addition, the protective coat 20 may be printed and have lines forming divisions for arranging the characters 2.

In practice, the plates 17 of the file 3 serve to carry and store the characters 2 which are applied flat thereto as on the panel 1.

When the plates 17 have relatively small dimensions, the file 3 is of the type illustrated. However, when the plates 17 have relatively large dimensions, a conventional type of file is no longer used, but a device comprising at least one drawer in which these plates are stacked, or at least one container in which they are hung.

This magnetic strip 4 may be applied flat to the panel 1 and is held there in a predetermined position by the magnetic effect. After positioning the strip 4 on the panel 1 the characters are positioned flat thereon and are supported against this strip 4 in such a manner that they are aligned rectilinearly. The strip 4 may be calibrated to render the characters 2 equidistant from one another.

In substance, the strip 4 is formed by a slide bar 21 and of a flat member 22, for example of metal. The slide bar 21 is formed by a half-open profiled member made of rubber or a similar synthetic material containing magnetic charges. The flat member 22 cannot be deformed out of its plane and is located in the groove of the half-open profiled member and strengthens the strip.

In practice the web and the flanges of the slide bar 21 and also the flat member 22 are each about 1 mm thick.

It is obvious that the invention is not exclusively limited to the embodiment illustrated and many modifications may be made to the shape, the arrangement and the composition of some of the elements used in its production provided that these modifications do not contradict the subject of each of the following claims.

I claim:

1. A kit of lightweight, inexpensive, reusable and portable components for forming both temporarily and with facility any of a multiplicity of advertising messages comprising a display sheet formed by a flat, thin and flexible mild steel sheet adapted to be mounted in full view and preferably suspended from the ceiling of a commercial area, such as a store and the like, a plurality of characters having a flat, flexible, and blocked-out form each magnetically attractive on one of their sides and of only minimal thickness that said characters mounted on said display sheet on either side and optionally on both sides create the visual impression of a lettered placard, an alignment strip having a body formed of rubber or similar synthetic material including a flat rectangular web portion, a recess on one side of said web portion for supporting a rigid member when it is desired to rigidify said alignment strip in the placement of characters on said display sheet, and said web portion being magnetically attractive on at least the other side adapted to be received on a support surface and a portable loose-leaf filing device including a plurality of thin, flat and flexible mild steel sheets each carrying silkscreen printed images representative of said characters to be received on respective sheets so that these characters may be filed in an orderly fashion for quick access, each said character being susceptible to be manually detached by slight flexure of the sheet to which it is magnetically attached, and each said character being set on said display sheet by implementation of said alignment strip to form said temporary advertising message, said advertising message capable of being set in any of a rectilinear and non-rectilinear fashion according to the capability of said alignment strip to flex along its longitudinal sides with each said character so disposed being retained in the set position by magnetic attraction between said character and said display sheet.

2. A kit according to claim 1 wherein the characters include letters, figures and signs including crossing signs necessary for composing the lines of each temporary advertising message, said characters being formed of rubber or similar synthetic material wherein are dispersed discrete particles of barium ferrite, and each character having a thickness of not more than about 0.5 mm and capable of magnetic attraction such that the characters of said message displayed on said display sheet will not move even in the event said display sheet is displaced.

3. A kit according to claim 1 wherein each display sheet has a thickness of no more than about 0.5 mm and provided on both sides with two thin coats of permeable protective paint, the painted sides having optionally printed thereon silk-screen decorating designs and/or permanent partial messages, the sheet being advantageously provided along any of it edges with a protective resilient profiled member in rubber or similar material which grips said edge.

4. A kit according to claim 1 wherein each sheet of the portable loose-leaf filing device is provided on each side with a coat of permeable protective material with the silkscreeen images of the components to be stored magnetically being represented on either side of each sheet.

5. A kit according to claim 4 wherein the sheets of the portable filing device have at one side lateral holes, and said filing device comprises a folder equipped with metal rings which may be opened whereby the sheets can be engaged with the rings and stacked in the folder.

* * * * *